United States Patent [19]

Kable

[11] Patent Number: 4,695,680
[45] Date of Patent: Sep. 22, 1987

[54] STYLUS FOR POSITION RESPONSIVE APPARATUS HAVING ELECTROGRAPHIC APPLICATION

[75] Inventor: Robert G. Kable, Dublin, Ohio

[73] Assignee: Scriptel Corporation, Columbus, Ohio

[21] Appl. No.: 879,331

[22] Filed: Jun. 27, 1986

[51] Int. Cl.⁴ .............................................. G08C 21/00
[52] U.S. Cl. ...................................................... 178/19
[58] Field of Search ............................ 178/18, 19, 20; 340/709; 346/139 C

[56] References Cited

U.S. PATENT DOCUMENTS

4,158,747 6/1979 Muller et al. ......................... 178/19

Primary Examiner—Stafford D. Schreyer
Attorney, Agent, or Firm—Mueller and Smith

[57] ABSTRACT

A stylus for use with an electrographic system of a variety wherein a digitizer surface is excited. The stylus accomplishes capacitive coupling with the surface without distortion due to perpendicular orientation of its central axis with respect to the digitizer surface. Due to the employment of a carefully shielded signal transmission rod in conjunction with a conductive body wall, spurious noise developed through the body and hand of the user is avoided. A switching technique wherein the stylus is depressed into the digitizer surface is provided, preferably employing a Hall effect switching device.

20 Claims, 10 Drawing Figures

STYLUS FOR POSITION RESPONSIVE APPARATUS HAVING ELECTROGRAPHIC APPLICATION

BACKGROUND OF THE INVENTION

Investigators have developed a variety of technical approaches to the generation of coordinate pair signals from electrographic devices. Industrial requirements for these devices are increasing concomitantly with the evolution of computer graphics, computer-aided design, and computer-aided manufacturing systems. Thus, a considerable degree of accuracy in pinpointing physical conditions upon the surfaces of the digitizers is required for many applications.

The operation of a digitizer or graphics tablet generally involves the same manual procedures as are employed in conventional graphics design, generally, a stylus representing a writing instrument being drawn across or selectively positioned upon the surface of the digitizer. In turn, the electrographic device responds to the position of the stylus to generate analog paired coordinate signals which are digitized and conveyed to a host computer facility.

A variety of design approaches have been employed in the fabrication of digitizer structures. The more recent and improved approaches to such designs have been to resort to a capacitive coupling of the stylus with the position responsive surface to generate analog paired coordinate signals. Such capacitive coupling can be carried out either with a grid layer which is formed of spaced linear arrays of conductors or through resort to the use of an electrically resistive material layer or coating.

An immediately apparent advantage of developing position responsive surfaces or digitizers having writing surfaces formed of a continuous resistive material resides in the inherent simplicity of merely providing a resistive surface upon a supportive substrate such as glass or plastic. Further, unlike conventionally encountered grid structures, the resistive coatings as well as their supportive substrates may be transparent to considerably broaden the industrial applications for the devices. For example, the digitizers may be placed over graphics or photographic materials for the purpose of tracing various profiles.

A variety of technical problems have been encountered in the development of resistive coating type digitizer devices, one of which concerns the non-uniform nature of the coordinate readouts achieved with the surfaces. Generally, precise one-to-one correspondence or linearity is required between the actual stylus position and the resultant coordinate signals. Because the resistive coatings cannot be practically developed without local resistance (thickness) variations, the nonlinear aspect of the otherwise promising approach has required a considerable amount of investigation and development. Exemplary of such development is the border treatment or switching technique of Turner in U.S. Pat. No. 3,699,439 entitled "Electrical Probe-Position Responsive Apparatus and Method", issued Oct. 17, 1972, and assigned in common herewith. This approach uses a direct current form of input to the resistive surface from a hand held stylus, the tip of which is physically applied to the resistive surface. Schlosser et al. describes still another improvement wherein an AC input signal is utilized in conjunction with the devices and signal treatment of the resulting coordinate pair output signals are considerably improved. See U.S. Pat. No. 4,456,787 entitled "Electrographic System and Method", issued June 26, 1984, also assigned in common herewith. Position responsive performance of the resistive layer devices further has been improved by a voltage wave form zero crossing approach and an arrangement wherein AC signals are applied to the resistive layer itself to be detected by a stylus or tracer as described in U.S. Pat. No. 4,055,726 by Turner et al. entitled "Electrical Position Resolving By Zero Crossing Relay", issued Oct. 25, 1977 and also assigned in common herewith. Substantially improved accuracies for the resistive surface-type digitizer devices have been achieved through a correction procedure wherein memory retained correction data are employed with the digitizer such that any given pair of coordinate signals are corrected in accordance with data collected with respect to each digitizer resistive surface during the manufacture of the digitizers themselves. With such an arrangement, the speed of correction is made practical and the accuracy of the device is significantly improved. The correction table improvements for these surfaces is described, for example, in Application for United States Patent, Ser. No. 06/664,980 Oct. 26, 1984 by Nakamura et al. and assigned in common herewith now as well as in Application for United States Patent, Ser. No. 06/742,733, entitled "Electrographic System and Method", filed June 7, 1985 by Nakamura et al. and assigned in common herewith, now U.S. Pat. No. 4650,926.

Capacitive coupling using a stylus has been employed with grid layers which are formed as adjacent but spaced-apart arrays of elongate thin conductors. For example, these conductors may be provided as lines of silver ink deposited in orthogonally disposed relationship upon opposite faces of a sheet of insulative material such as Mylar. A resistance network is employed with each of the conductor arrays such that a predetermined resistance is coupled between each conductor from first to last. A technique considerably improving this form of grid array digitizer wherein the grid arrays themselves are excited by an AC signal for data collection from a stylus is described in an application for United States Patent by Kable entitled "Position Responsive Apparatus, System and Method Having Electrographic Application", Ser. No. 791,324 filed Oct. 25, 1985 and assigned in common herewith, Abandoned.

The stylus structures which are utilized with digitizer tablets also must be designed to avoid error associated with their capacitive coupling to a surface. This is particularly true in the preferred case of digitizer structures wherein the surfaces thereof themselves are excited by an AC current. Generally, the hand and body of the user of the stylus carries part of this AC signal to generate error induced into the stylus from the hand itself. Further, early stylus structures have been found to exhibit error in position data acquisition due to the common technique by which the user holds the stylus. In this regard, the comfortable position for holding the stylus is that which normally would be employed in holding a pencil or other conventional writing device, i.e. at an angle with respect to the plane of the digitizer surface. When such angularity of retention is employed by the user, early devices exhibited a variation of capacitive coupling geometry such that the resultant coordinate pair position data were inaccurate. Further, it is necessary for the operator to signal to the digitizer circuitry that a position wherein coordinate pair data are desired has been reached. This often has been accomplished through a switch which is actuable by the finger of the user. A more convenient approach has been to employ a cartridge technique wherein the user presses the point of the stylus into the digitizer surface to actuate the switch. This form structuring led to inaccuracies due to the length of the pickup capacitive coupling rod which was exposed to the surface varying somewhat for each position desired. To avoid scratching the delicate digitizer surfaces, it has been found desirable to cover the tip of the stylus with some form of plastic material. However, with the provision of such covering or insertion of the pickup rod or conductor within the plastic tip or the like, static electricity has tended to build within the stylus device itself. Finally, it has been found desirable to provide some technique by which the user or operator can be appraised of the acceptance by a host computer of the location of coordinate pair data upon the actuation of some stylus mounted switching device.

SUMMARY

The present invention is directed to an improved stylus for use with digitizers having graphics surfaces which are excited, for example, from an AC source. This stylus functions to "pick up" coordinate data in the form of position responsive signals and effect the transmission of corresponding position data signals to a controlling device or circuit. The stylus of the invention is structured such that the tip portion thereof is made capable of capacitively coupling to the digitizer surface without the development of a coupling region nonsymmetrical to an extent where the location data developed are inaccurate. This is achieved through very selective shielding and control of the extent of the exposure of the tip portion of a signal transmission rode extending through the stylus itself. Preferably, the stylus works in a manner wherein a switching function is carried out by the depression of the body of the stylus toward the digitizer surface to move the tip inwardly and actuate a switching mechanism.

Another feature of the invention is to provide a stylus for receiving position responsive signals from an electrographic surface for transmission by cable to a control circuit, the surface being excited by time varying source of select frequency. The stylus includes an elongate, hand grippable body having an outwardly disposed, electrically conductive wall surrounding an internally disposed cavity, a forwardly disposed nose portion and a rearwardly disposed body region. An elongate cartridge having an electrically conductive wall extending about a cavity internal thereto and having a tip receiving portion as well as a rearward edge is provided. This cartridge further includes an electrically insulative tip fixed within the tip receiving portion and an electrically insulated spacer coupled with its rearward edge and supported within the cavity formed by it. An elongate, electrically conductive signal transmission rod is positioned to extend through the cavity of the cartridge and is spaced from the walls thereof and supported between the electrically insulated tip and the electrically insulated spacer. A spring mounting arrangement extending rearwardly from the insulated spacer is provided for retaining an electrically conductive spring and effecting electrical contact between the signal rod and the spring. The cartridge wall is supported within the cavity of the outer body of the stylus and is slidable between extended and retracted positions selected to expose a predetermined length of the signal transmission rod. An electrically conductive spring is mounted upon the spring mounting assembly in biased relationship against a spring retainer which is mounted within the rearward region of the cavity of the stylus body. The circuit is mounted within that same cavity in the rearwardly disposed region thereof for receiving the position responsive signals from the spring when the cartridge is in its retracted position for effecting transmission of position data signals in correspondence therewith through the cable and electrically effecting a ground communication between the cable and the outwardly disposed wall of the stylus.

Another feature of the invention is to provide a stylus for receiving position responsive signals from an electrographic surface for transmission by cable to a control circuit, the surface being excited by a time varying source of select frequency. The stylus includes an elongate, hand grippable body having an outwardly disposed, electrically conductive wall surrounding a cavity having a centrally disposed longitudinal axis, a forwardly disposed nose portion and a rearwardly disposed region. An elongate, electrically conductive signal transmission rod extends along the centrally disposed axis from a tip mounting portion to a connector portion and an electrically insulative tip is mounted upon the tip mounting portion of that rod. An electrically insulative spacer is positioned within the cavity for slidably supporting the signal transmission rod for movement between extended and retracted positions, the tip mounting portion extending outwardly from the body nose portion a predetermined distance when the rod is in its retracted position. A carriage assembly having a connector portion and a spring mounting portion is provided and another electrically insulative spacer is positioned within the cavity at the body rearwardly disposed portion for slidably mounting the carriage assembly therewithin and located to effect force transmissable contact between the connector portions of the assembly. A spring is mounted along the carriage assembly spring mounting portion and in abutment with the other spacer for biasing the carriage assembly to move the signal transmission rod into its extended position. A circuit is provided which is mounted within the cavity rearwardly disposed region for receiving position responsive signals from the signal tranmission rod when the rod is in its retracted position and for effecting transmission of position data signals in correspondence therewith through the cable and electrically effecting ground communication between the body wall and the cable. Means are provided for electrically coupling the circuit with the signal transmission rod.

Other objects of the invention will, in part, be obvious and will, in part, appear hereinafter. The invention, accordingly, comprises the apparatus possessing the contructing, combination of elements, and arrangement of parts which are exemplified in the following detailed disclosure.

For a fuller understanding of the nature and objects of the invention, reference should be had to the following detailed description taken in connection with the accompanying drawings.

DETAILED DESCRIPTION

Figure 1:
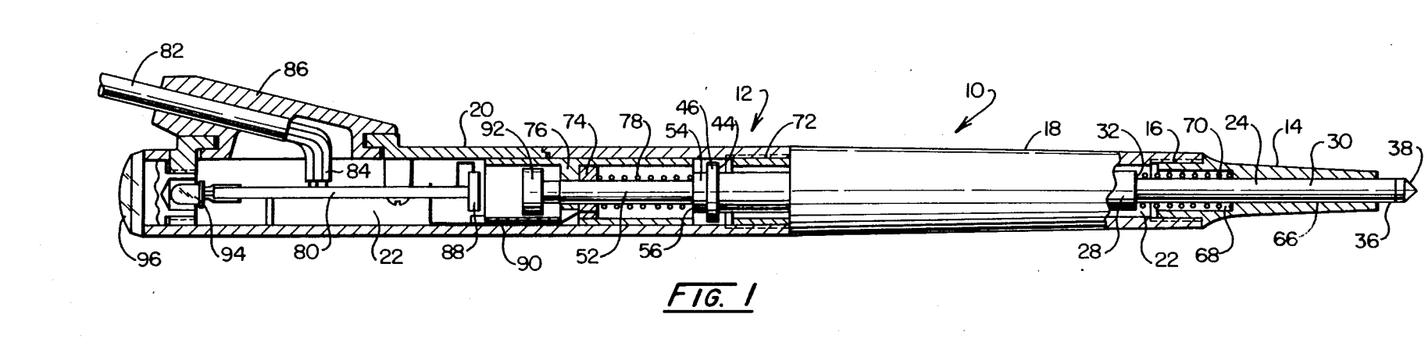
FIG. 1 is a side view of one embodiment of the stylus according to the invention with the portions broken away to reveal internal structure.

Referring to FIG. 1, one embodiment of a stylus according to the invention is revealed in general at 10. Stylus 10 is fashioned having dimensions corresponding with a typical writing instrument such as a fountain pen or the like. The device is formed having an elongate, hand grippable body comprised of an outwardly disposed and electrically conductive wall represented generally at 12. Wall 12 may achieve its electrical conductivity, for example, by being fabricated of aluminum and the like and the conductivity so obtained is employed for the purpose of controlling signals which may be generated through the hand and body of the user. Wall 12 generally is formed having a nose portion 14 which is threadably engaged at 16 with a more forwardly disposed portion of the wall as shown at 18. Wall portion 18 extends to a rearwardly disposed region represented generally at 20 and the entire assemblage develops a cavity region seen for example at 22. Extending coaxially within the cavity 22 is an elongate cartridge represented generally at 24 which, in the interest of clarity, is revealed as a separate illustration in FIG. 2.

Figure 2:
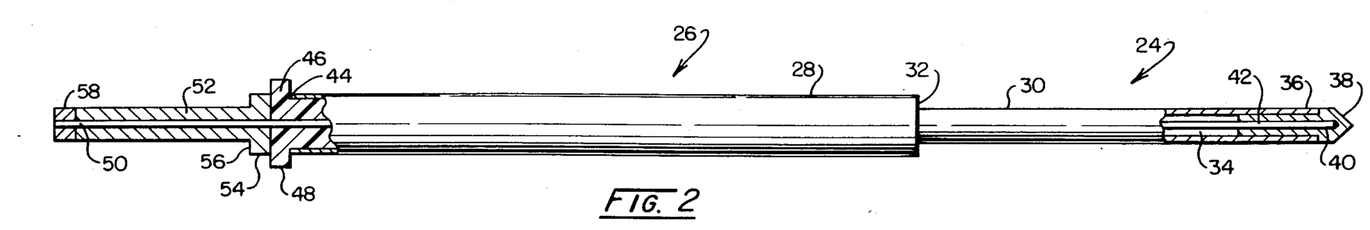
FIG. 2 is a side elevational view of a cartridge employed with the stylus of FIG. 1 with portions cut away to reveal the internal structure.

Referring to FIG. 2, the cartridge 24 is shown to be comprised of an electrically conductive cylindrical wall represented generally at 26 which has a central portion 28 and a forward portion 30 of lesser diameter which is inserted into portion 28 and retained therein by swaging or other suitable arrangement. This provides an anular abutting surface 32 serving a spring retainer function. This provides an anular abutting surface 32 serving a spring coaxial and develop a cavity 34 extending the length of wall 26. Wall 30 contains a tip receiving portion 36 within which is supported an electrically insulative (plastic) tip 38 which may be observed to have a conical or pointed end. Tip 38 is seen to be formed having an internal cylindrical recess 40 which extends about its central axis a predetermined distance past the tip receiving portion 36 and the entire tip assemblage serves to support one end of an elongate, electrically conductive signal transmission rod 42 within cavity 34 coaxially with walls 28 and 30. Rod 42 is supported at the rearward edge 44 of wall 28 by an insulative spacer 46 which may be structured to provide a flanged portion 48 of increased diametric extent. Spacer 46 functions to retain the rearwardly disposed portion of signal transmission rod 42 in coaxial alignment along cavity 34 and the rod is seen to extend outwardly from spacer 46 at 50 through the centrally disposed bore of a cylindrical spring mounting assembly 52. Note that assembly 52 also is formed having a flanged portion of greater diametric extent at 54 which functions to provide an annularly shaped spring abutment surface 56. Assembly 52 is formed of an electrically conductive material such as brass and is connected with the rearward portion 50 of rod 42 by a metallic tip component or the like 58 by soldering. This soldering may extend as far as practical into the union between assembly 52 and the rearward portion 50 of rod 42. Thus, any signal picked up in the vicinity of tip 38 by rod 42 will be transmitted into the assembly 52.

Figure 3:
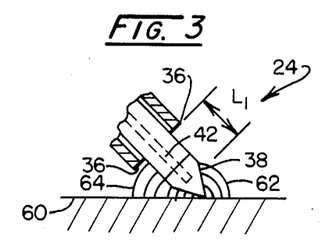
FIG. 3 is a schematic representation of a cartridge according to FIG. 2 in relation to a digitizer surface and showing field lines of capacitive coupling for one case.
Figure 4:
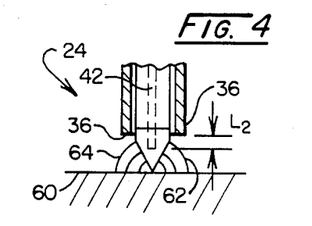
FIG. 4 is a schematic representation of a cartridge according to FIG. 2 in a vertical orientation with respect to a digitizer surface and showing symmetrical coupling lines as well as a variation of transmission rod shielding.

Now looking to the consideration of the anular orientation of cartridge 26 or stylus 10 as it is held by the operator and the resultant effect of the capacitive coupling, reference is made to FIG. 3. In the latter figure, the receiving portion 36 of the forward wall portion 30 of cartridge 26 is revealed in pictorial and exaggerated fashion in the interest of clarity. This portion 36 is seen coupled to the tip assembly 38 within which extends the signal transmission rod 42. Note that rod 32 extends within the tip 38 a distance $l_1$ beyond the tip receiving portion 36 edges of the wall 30 of cartridge 24. These walls including the portion 36 function as a ground shield for the rod 42. For the instant illustration, they are terminated to an extent where the distance $l_1$ is excessive, thus, a non-uniform capacitive coupling is evolved between the rod 42 forward portion and an AC excited resistive surface, for example, as represented at 60. In general, the capacitive coupling may be pictorially represented by the coupling lines at either side of the drawing shown at 62 and 64. Those lines at 64 will be seen to represent a greater region of coupling influence than those at 62 and the result is a signal pick off which does not accurately represent the location of the pointed end of tip portion 38. Looking additionally to FIG. 4, it may be observed that the tip receiving portion 36 of the wall 30 extends further toward the tip of rod 32 such that a much lesser exposure of the tip of rod 42 represented by the distance $l_2$ is present. Here additionally, the cartridge 24 is shown having a vertical orientation such that the lines of coupling influence 62 and 64 are symmetrical to achieve an accurate readout. By maintaining this distance $l_2$ within acceptable limits, the operator may use the stylus 10 and, consequently, cartridge 24 at orientations as shown in FIG. 3 without undue loss of accuracy due to nonsymmetrical regions of coupling influence. The capability of modern digitizers to correct for this abnormality also has been enhanced with the developments described hereinabove by Nakamura et al. in connection with computer driven correction procedures. Additionally in this regard, the linearity of the digitizer devices has improved to permit the structuring of wall 30 at rod 42 and tip 38 as shown with satisfactory results. Generally, the distance, $l_2$ should fall within a range of about 0.050 to 0.100 inch.

Returning to FIG. 1, it may be observed that the foward poriton of cartridge 24 is slidably supported within a central bore 66 of nose portion 14. Nose portion 14 additionally is shown having a counter bore 68 within which is disposed an electrically conductive helical spring 70 which seats at one end against the bottom of bore 68 and abuts at its other end against abutting surface 32 of cartridge outer wall 26. The rearwardly disposed portion of wall 26 and cartridge 24 is slidably supported coaxially with wall 12 by a plastic electrically insulative spacer 72 and the cylindrical spring mounting assembly 52 of cartridge 24 is seen to extend through an annular brass spring retainer 74, which in turn, is supported by another plastic electrically insulative spacer 76. An electrically conductive helical spring 78 is positioned over the spring mounting assembly 52 such that one end of it abuts against annular abutting surface 56 of flange portion 54 and the opposite end abuts against the face of spring retainer 74. Thus, an electrical path is developed along signal transmission rod 42 into the spring mounting assembly 52, spring 78 and spring retainer 74. Spring 78 biases the cartridge 24 in the opposite direction as spring 70 and thus, the cartridge "floats" within the cavity 22 determined by outer conductive wall 12 of stylus 10. The rearwardly disposed portion 20 of the wall 12 also functions to support a circuit which may be mounted, for example, on a small circuit board shown at 80 which functions to provide an initial signal treatment and also is the point of communication via coaxial cable 82 with a control circuit which generally will be found to be designed in conjunction with a microprocessor logic aspect. Leads from coaxial cable 82 are shown coupled with board 80 at 84 and such coupling will include a ground connection generally developed from the shield of cable 82. Cable 82 is supported from a plastic, electrically insulative boot 86 such that it enters the stylus 10 at a skewed angle which is found to be convenient for operators. One end of the circuit board 80 is shown supporting a Hall effect switching device 88 and an electrical lead 90 which extends from a connection with the circuit supported by board 80 to the electrically conductive spring retainer 74. Thus, the picked up or capacitively coupled position responsive signal developed at rod 42 is conveyed through the spring mounting assembly 52 including the spring 78 for connection with the spring retainer 74 and thence via lead 90 to signal treatment components at board 80. As a result, there is no required flexure of the lead 90, adequate assured electrical contact is being made by the electrically conductive spring 78. Because of the relatively high frequency excitation of surfaces as at 60 involved with the use of the stylus 10, for example, typically 120 KHz, d.c. losses due to corrosive effects are essentially dismissable. To simplify operator switching procedures wherein the operator or user of stylus 10 desires to transmit coordinate location data to a computer, the switching manipulative activity involves simply the depressing of tip 38 of cartridge 24 of stylus 10 into the electrographic surface being employed. This causes cartridge 24 to move from an extended position as shown to a retracted position limited, for example, by the abutment of flange 44 against the edge of plastic spacer 76. This action causes a permanent magnet 92 attached to the tip 58 of spring retainer assembly 52 to move rearwardly toward the Hall effect switching device 88. The switching device 88 thus is actuated to permit the circuit carried by circuit board 80 to convey the effect of such actuation to the computer control via cable 82. If the data are accepted, the host computer or control will provide a return signal which provides for the energization of a light emitting diode (LED) 94 positioned at the rearward extent of the board 80. This energization may be perceived by the operator through a lens 96 positioned against the rearward edge of the rearward wall portion 20.

Figure 5:
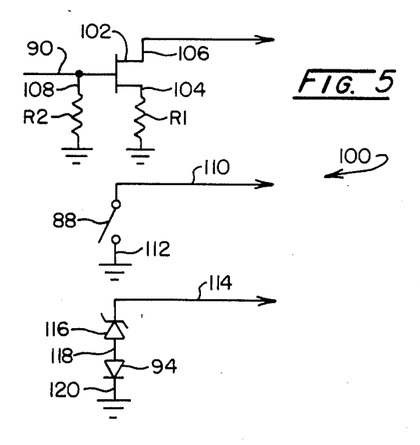
FIG. 5 is a schematic electrical circuit which may be employed with the stylus of FIGS. 1 and 6.

Referring to FIG. 5, the circuit mounted upon board 80 within stylus 10 is revealed generally at 100. Lead 90 as represented in FIG. 1 is shown being directed to the gate of a field effect transistor (FET) 102. Transistor 102 functions as a source follower, and in this regard, its source terminal at line 104 is coupled through a resistor R1 to ground as established by the shield of cable 82 (FIG. 1). The drain terminal of transistor 102 is coupled via lead 106 and cable 82 to a central control circuit. Accordingly, as the transmitted signal voltage is submitted along line 90 to develop a gate voltage, that voltage appears across resistor R1 and the current flowing through resistor R1 will develop at the drain terminal of FET 102 at line 106. Thus, a current form of position data signal is transmitted to the control system via cable 82. The employment of such a current transmission avoids noise phenomena and the like which otherwise will be encountered within cable transmission systems. A resistor R2 is shown coupled within line 108 extending between line 90 and ground. This resistor is selected to provide a slight shunt path to ground to accomodate for any static buildup within the stylus 10. When tips as at 38, formed of plastic material and the like, are drawn across the resistive surfaces at hand, occasion is available for the buildup of a static charge. The resistor R2 provides a low impedance path to dissipate such charges. Circuit 100 also includes the earlier described Hall effect switch 88 which is shown actuable to close incoming lead 110 of coaxial cable 82 to ground through lead 112. Through the employment of a conventional approach such as pull-up resistors and the like, this closure then may be detected by the control circuit. The circuit 100 further includes a powering lead 114 which extends to a zener diode 116 and thence via line 118 to light emitting diode 94, the cathode of which is coupled via line 120 to ground. With the arrangement shown, the lead 114 may supply continuous power to Hall effect switch 88 to permit its operation. At such time as an actuation of switch 88 occurs and that actuation and data are accepted by the control, then the voltage level at line 114 may be increased over the control level of diode 116 to cause the illumination of light emitting diode 94. With the arrangement, one lead is required to be carried by cable 82 (FIG. 1) is eliminated.

Figure 6:
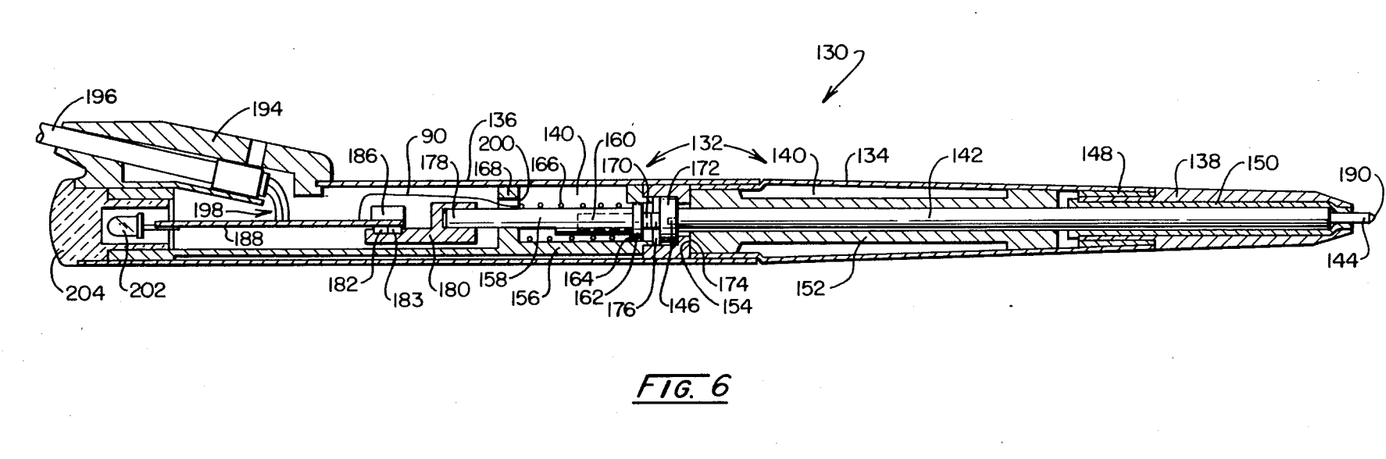
FIG. 6 is a sectional representation of another embodiment of a stylus according to the invention.

Referring to FIG. 6, another embodiment for a stylus according to the invention is represented generally at 130. Stylus 130 includes a main body 132 having an outwardly disposed electrically conducting wall extending from a forward region 134 to a rearwardly disposed region 136. Additionally, the body 132 includes a nose portion 136 formed of electrically conductive material. These conductive materials for wall portions 134 and 136 as well as nose 138 may be provided, for example, of aluminum. Wall portions 134 and 136 are substantially cylindrical and enclose a cavity 140 within which there is coaxially disposed an elongate, electrically conductive signal transmission rod 142 which extends from a necked down tip mounting portion 144 to a rearwardly disposed connector portion 146. The rod 142 is supported coaxially with the body 132 of stylus 130 by a first insulative assembly including insulative insert 148 and insulative sheath 150 extending through the latter. Shown in its extended or forward orientation, rod 142 is shown to be shielded at its forwardmost region by the configuration of nose 138. The rod further is supported in its coaxial orientation with body 132 by an electrically insulative plastic spacer or insert 152 which extends to a hollow cylindrically shaped screw head support 154. Support 154, in turn, is abuttably connected with a plastic electrically insulative cartridge support 156 which slidably carries an electrically conductive carriage 158 having an internally threadable bore 160 and an intrically formed flange portion 162 having an anular spring abutting surface 164. An electrically conductive helical spring is positioned over the carriage 158 such that it abuts and is in electrical communication with the abutting surface 164 as well as against the retainer portion 168 of carriage support 156. A metal, for example, brass machine screw 170 having a slotted head 172 is threadably engaged within the bore 160 and is in rotational connection with connector portion 146 of the signal transmission rod 142. With the arrangement shown, during assembly, by appropriate rotation of the screw head 172 the distance by which the carriage 158 may be driven by pushing down the stylus 130 into the digitizer surface may be adjusted. In this regard, note that the head 172 is positioned in abuttment with the internal face 174 of spacer or screw head support 154. The screw head further is limited by engagement with the forwardly disposed edge 176 of the carriage support 156. Thus, an accurate control may be made over the movement of the device. The end portion 178 of carriage 158 is shown coupled to a magnet support portion 180 which supports two bar magnets 182 and 183 in opposite polar adjacency. In this regard, the south pole of one of the magnets is placed adjacent the north pole of the opposite magnet in side by side adjacency. Magnets 182 and 183 are seen positionable with respect to a Hall effect type switching device 186, mounted in turn upon a circuit board 188 within rearwardly disposed region 136 of body 132. A plastic tip is coupled to the tip mounting end 144 of signal transmission rod 142. Accordingly, when the stylus 130 is pushed inwardly against a given digitizer surface, it will move to its retracted position a distance controlled by the rotation of machine screw 170. This, in turn, will move the bar magnets 182 and 183 to an actuating position beneath Hall effect switch 186.

Figure 7:
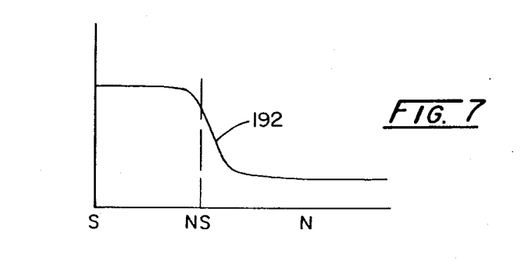
FIG. 7 is a plot showing magnetic flux characteristics for a paired bar magnet assemblage provided in conjunction with the stylus of FIG. 6.

Referring momentarily to FIG. 7, the effect of positioning the bar magnets 182 and 183 is revealed by a curve 192 representing the strength of the magnetic field of the magnets 182 and 183 as a function of the distance across them as they are associated in side by side relationship. It may be noted that at the union of the north/south poles, a steep alternation of flux level will be achieved. As a consequence, very sharp actuation of the Hall effect switch 186 is made available with the assemblage shown.

Returning to FIG. 6, the rearwardly disposed wall portion 136 of the body 132 of stylus 130 against is shown supporting a plastic boot 194, which in turn, supports a coaxial cable 196 the leads of which are shown grouped at 198 and extending to the circuit components of the circuit board 188. This circuit has been described at 100 in connection with FIG. 5. In the latter regard, the lead 90 again is shown extending from the circuit components at board 188 to connection with spring 166 through access opening or hole 200 within retainer portion 168 of carriage support 156. Similar to the earlier structure, the board 188 also supports a light emitting diode 202 the illumination from which may be observed through a clear plastic lens 204 positioned within the rearward portion of the wall 136.

Figure 8:
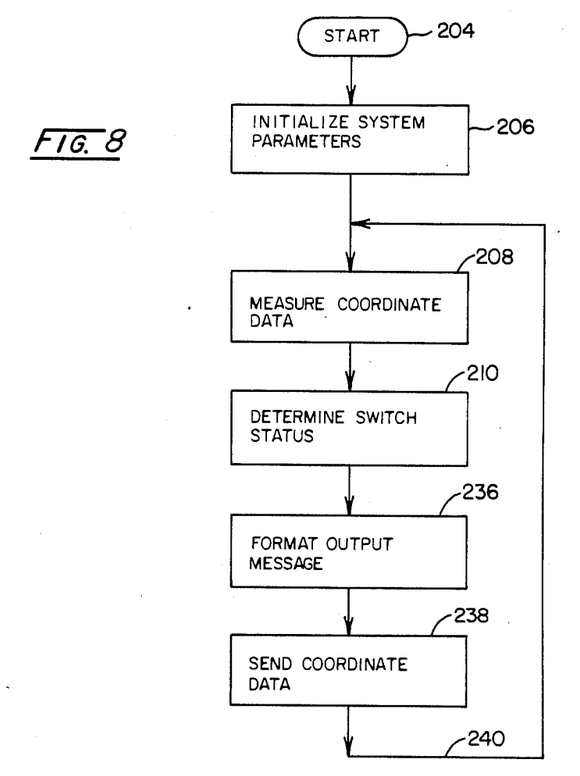
FIG. 8 is a block flow diagram showing a general program with which the stylus of the invention may perform.

Considering the general digitizer control approach which styluses as at 10 and 130 may perform, reference is made to the flow chart of FIG. 8. A detailed discourse as to the program represented by this chart is provided in U.S. Pat. No. 4,600,807 (supra). FIG. 8 shows that the commencement of a start command is represented by node 204. The program functions to initialize system parameters as represented at block 206. Once these parameters are initialized, then as represented at block 208 coordinate data are measured, i.e. the position data signals are read and subjected to appropriate ratioing and correction to develop appropriately accurate data. The program then turns to the instructions represented at block 210 wherein the status of Hall effect switches 88 or 186 is determined. In this regard, these switches may have a multiple function which may be provided by employing a menu area of the digitizer circuit. Looking momentarily to FIG. 9, a subroutine for use of the switches in this manner is revealed. The subroutine of FIG. 9 commences with node 212 which is directed to the inquiry block 214 wherein a determination is made as to whether the stylus has been actuated in a menu area of the digitizer surface. In the event that the stylus is at that location and the switch has been actuated, then as represented by line 216 and inquiry block 218 a determination is made as to whether a function identity of the switch should be changed. In effect, the system maintains a memory of the last toggling of the switch with respect to its given or its designated function. Where the switch actuation has been made in the menu area, then as represented by line 220 and block 222, a new identifier is assigned to the instant actuation of the switch. The subroutine then exits as represented by line 224, line 226 and node 228.

Figure 9:
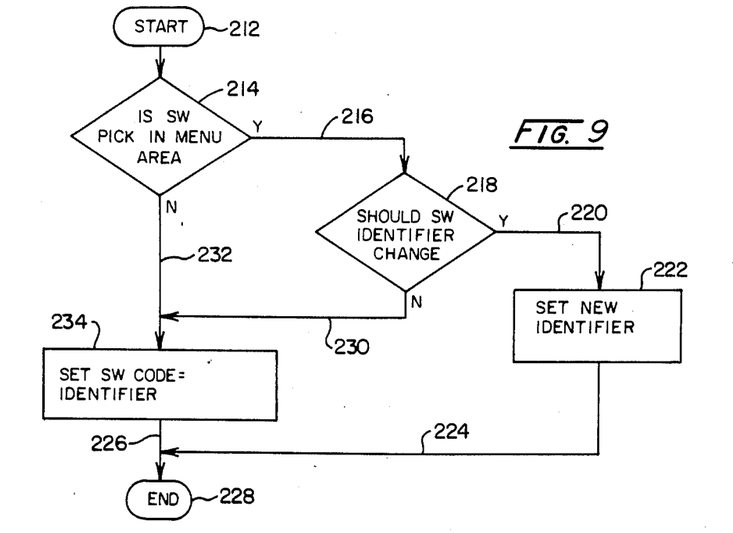
FIG. 9 is a flow diagram of a subroutine employed in conjunction with the program of FIG. 8.

In the event that the determination at decision block 214 is that the switch or stylus is not in the menu area, then as represented by line 232 and block 234, the existing identifier code is maintained and the subroutine exits as represented by line 226 and node 228.

Returning to decision block 218 where a determination has been made that the switch identifier should not change, then as represented by line 228, no alteration is made to the identification of function for the instant switch condition and as is further represented by lines 230 and block 232, the existing identifier code is retained. The subroutine then ends as represented by lines 226 and node 228.

Returning to FIG. 8, following the determination of switch status, the corrected and compiled coordinate pair data are formatted for transmission as represented by block 236. Following this formatting procedure, the coordinate data are sent as represented by block 238 and the general routine returns as represented by line 240 to evaluate an X coordinate data input.

Figure 10:
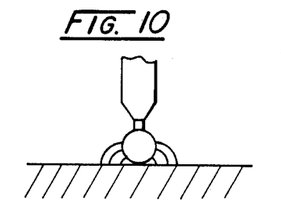
FIG. 10 is a schematic representation of a stylus tip having an orientation immune tip.

Looking to FIG. 10, an orientation immune configuration for a stylus tip is revealed at 130. Spherical in design, the tip 130 will generate a substantially uniform region of capacitive coupling with surface 60 notwithstanding its orientation, i.e. the lines of coupling influence 62 and 64 remain symmetrical about the tip.

Since certain changes may be made to the above described apparatus without departing from the scope of the invention herein involved, it is intended that all matter contained in the description thereof or shown in the accompanying drawings shall be interpreted as illustrative and not in a limiting sense.

I claim:

1. A stylus for receiving position responsive signals from an electrographic surface for transmission by cable to a control circuit, said surface being excited by a time varying source of select frequency, comprising an elongate, hand grippable, body having an outwardly disposed electrically conductive first wall surrounding a first cavity, a forwardly disposed nose portion and a rearwardly disposed region;

an elongate cartridge having an electrically conductive second wall extending about a second cavity to a tip receiving portion and further extending to a rearward edge, an electrically insulative tip fixed within said tip receiving portion, an electrically insulative spacer coupled with said rearward edge and supported within said second cavity, an elongate, electrically conductive signal transmission rod extending through said second cavity, spaced from said second wall and supported between said electrically insulative tip and said electrically insulative spacer, spring mounting means extending rearwardly from said insulative spacer for retaining an electrically conductive spring and effecting electrical contact between said signal rod and said spring, said cartridge second wall being supported within said first cavity and said cartridge being slideable to a retracted position exposing a predetermined length of said signal transmission rod at said electrically insulated tip selected to receive said position responsive signals outwardly from said nose portion;

spring retainer means mounted within said first cavity rearward region for providing a spring biasing support;

electrically conductive spring means mounted upon said spring mounting means and in biased relationship against said spring retainer means; and circuit means mounted within said first cavity rearwardly disposed region for receiving said position responsive signals from said electrically conductive spring means for effecting transmission of position data signals in correspondence therewith through said cable and electrically effecting ground communication between said first wall and said cable.

2. The stylus of claim 1 in which said exposed predetermined length of said tip is selected to provide a length of said signal rod extending outwardly from said nose portion of between about 0.050 and 0.100 inch.

3. The stylus of claim 1 in which:
said spring retainer means is electrically conductive and in spring biased abuttment and electrical communication with said spring means; and
said circuit means includes lead means for effecting said receipt of said position responsive signals.

4. The stylus of claim 1 in which said circuit means includes switch means actuable to effect said transmission of said position data signals in response to movement of said cartridge to said retracted position.

5. The stylus of claim 1 including:
a permanent magnet coupled with said cartridge adjacent said spring mounting means and moveable with said cartridge; and
said circuit means includes switch means actuable by said magnet when said cartridge is moved to said retracted position to effect said transmission of said position data signals.

6. The stylus of claim 5 in which said switch means is a Hall effect device.

7. The stylus of claim 1 in which said circuit means includes shunt resistor means coupled with said ground and in electrical communication with said signal transmission rod for dissipating static electrical phenomena developed upon said stylus.

8. The stylus of claim 1 in which said circuit means includes current source means coupled to receive said position responsive signals and convert them to said position data signals in the form of a corresponding current value.

9. The stylus of claim 1 in which:
said spring retainer means is electrically conductive and in spring biased abuttment and electrical communication with said spring means;
said circuit means includes lead means for effecting said receipt of said position responsive signals; and
said circuit means includes switch means actuable to effect said transmission of said position data signals in response to movement of said cartridge to said retracted position.

10. The stylus of claim 1 including:
a permanent magnet coupled with said cartridge adjacent said spring mounting means and movable with said cartridge;
said circuit means includes switch means actuable by said magnet when said cartridge is moved to said retracted position to effect said transmission of said position data signals; and
said circuit means includes shunt resistor means coupled with said ground and in electrical communication with said signal transmission rod for dissipating static electrical phenomena developed upon said stylus.

11. A stylus for receiving position responsive signals from an electrographic surface for transmission by cable to a control circuit, said surface being excited by a time varying source of select frequency comprising:

An elongate, hand grippable body having a outwardly disposed electrically conductive wall surrounding a cavity having a centrally disposed longitudinal axis, a forwardly disposed nose portion and a rearwardly disposed region;

an elongate, electrically conductive signal transmission rod extending along a centrally disposed axis from a tip mounting portion to a first connector portion;

an electrically insulative tip mounted upon said tip mounting portion;

first electrically insulative spacer means positioned within said cavity for slideably supporting said signal transmission rod for movement between extended and retracted positions, said tip mounting position extending outwardly from said body nose position a predetermined distance when said rod is in said retracted position;

a carriage assembly having a second connector portion and a spring mounting portion;

second electrically insulative spacer means positioned within said cavity at said body rearwardly disposed portion for slideably mounting said carriage assembly therewithin and located to effect force transmissable contact between said first and second connector portions;

spring means mounted along said carriage assembly spring mounting portion and in abuttment with said second spacer means for biasing said carriage assembly to move said signal transmission rod into said extended position;

circuit means mounted within said cavity rearwardly disposed region for receiving said position responsive signals from said signal transmission rod when said rod is in said retracted position, for effecting transmission of position data signals in correspondence therewith through said cable and electrically effecting ground communication between said body wall and said cable; and means electrically coupling said circuit means with said signal transmission rod.

12. The stylus of claim 11 in which said circuit means includes switch means actuable to effect said transmission of said position data signals in response to movement of said cartridge to said retracted position.

13. The stylus of claim 11 including a light emitting diode mounted within said body at said rearwardly disposed region and energizable through said circuit means from said control circuit in response to said switch means actuation.

14. The stylus of claim 11 in which:
said carriage assembly includes a magnet support portion and a permenent magnet fixed thereto and moveable therewith; and
said circuit means includes switch means actuable by said magnet when said transmission rod is moved to said retracted position.

15. The stylus of claim 14 in which said switch means is a Hall effect device.

16. The stylus of claim 15 in which said permanent magnet comprises two bar magnets arranged in opposite polar adjacency.

17. The stylus of claim 11 in which:
said carriage assembly second connector position comprises a threadably engaged screw having a cap rotatably engaged with said signal transmission rod first connector position;
said spring means is electrically conductive and in electrical communication with said signal transmission and through said first and second connector positions; and
said means electrically coupling said circuit means with said signal transmission rod comprises an electrical lead connected between said circuit means and said spring means.

18. The stylus of claim 11 in which said circuit means includes shunt resistor means coupled with said ground and in electrical communication with said signal transmission rod for dissipating static electrical phenomena developed upon said stylus.

19. The stylus of claim 11 in which said circuit means includes current source means coupled to receive said position responsive signals and convert them to said position data signals in the form of a corresponding current value.

20. The stylus of claim 11 in which said exposed predetermined length of said tip is selected to provide a length of said signal rod extending outwardly from said nose portion of between about 0.050 and 0.100 inch.

* * * * *